April 12, 1960

A. C. FIELDS 2,932,359

ELECTROSTATIC PRECIPITATORS

Filed May 1, 1957

Inventor:
Arnold C. Fields
by Robert J. Palmer
Attorney

Inventor:
Arnold C. Fields
by Robert J. Palmer
Attorney

April 12, 1960
A. C. FIELDS
2,932,359
ELECTROSTATIC PRECIPITATORS
Filed May 1, 1957
4 Sheets-Sheet 4
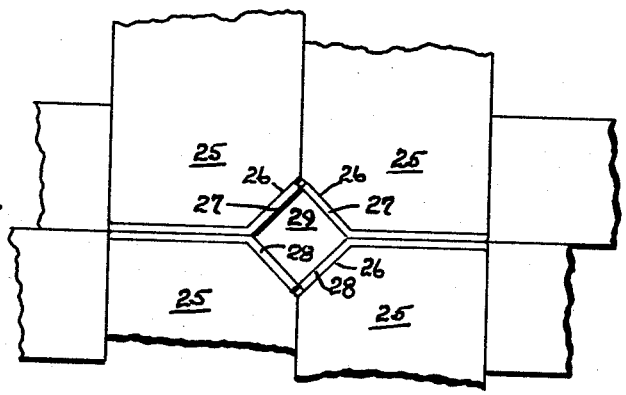
FIG. 4
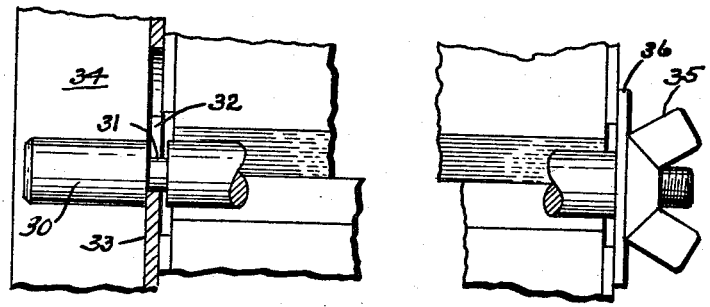
FIG. 5
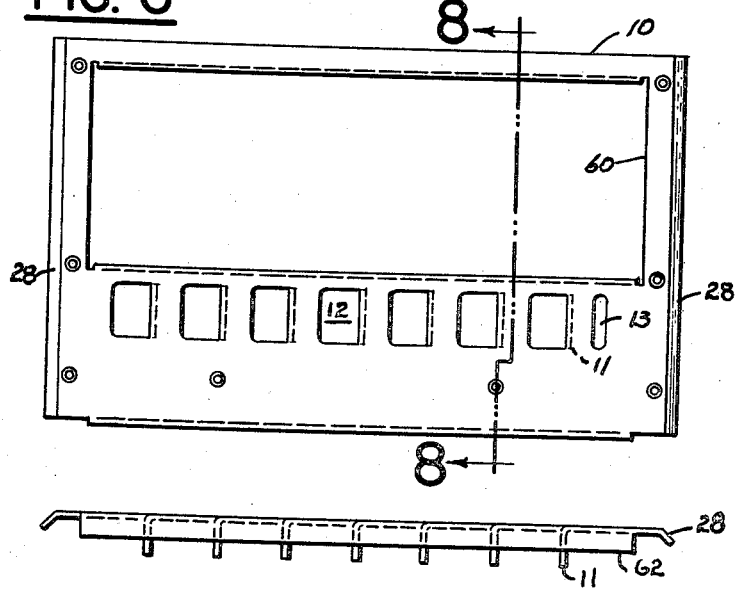
FIG. 6
FIG. 7
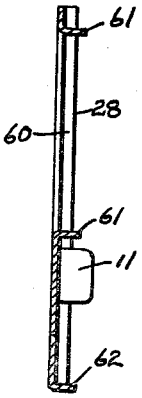
FIG. 8
Inventor:
Arnold C. Fields
by Robert J. Palmer
Attorney United States Patent Office 2,932,359
Patented Apr. 12, 1960

2,932,359
ELECTROSTATIC PRECIPITATORS
Arnold C. Fields, Medfield, Mass., assignor to Westinghouse Electric Corporation, East Pittsburgh, Pa., a corporation of Pennsylvania Application May 1, 1957, Serial No. 656,437
4 Claims. (Cl. 183—7)

This invention relates to electrostatic precipitators for removing small foreign particles such as dust, from gases such as air.

A feature of this invention is that the ionizer and collector cell of an electrostatic precipitator are combined in a single unit. Top and bottom plates of a unit have rear openings opposite the adjacent ends of the cell for permitting an adhesive or a cleansing liquid to pass through the collector plates of vertically stacked units, and have inwardly extending flanges on opposite sides of the ionizer and behind the collector plates which form baffles for preventing the gas being cleaned from flowing between the ends of the collector plates of adjacent upper and lower units.

Another feature of this invention is that the top and bottom plates of a unit have flanges that are slanted outwardly at their ends so that four adjacent units in two vertical and two adjacent rows, contact to form a rectangular enclosure for receiving a rod which secures the units to a supporting frame.

Another feature of this invention is that the top and bottom plates have punched out portions which extend into and support non-discharging ionizer electrodes, the openings left out by the removal of the portions forming liquid drain holes.

Another feature of this invention is that the charge collector plates of a unit are supported by tie rods which are attached at their ends to metal brackets which are supported by intervening insulators from the side plates of the unit.

Objects of this invention are to simplify and reduce the cost of construction of electrostatic precipitators.

Another object of this invention is to provide an improved ionizer assembly.

This invention will now be described with reference to the annexed drawings, of which:

Fig. 4 is an enlarged fractional view showing the rectangular enclosure formed by the beveled ends of the top and bottom plates of four adjacent units, for receiving a retaining rod;

Fig. 5 is an enlarged fractional view showing a portion of a retaining rod extending through the rectangular enclosure shown by Fig. 4, into a supporting frame;

Fig. 6 is a plan view, on a reduced scale, of one of the top plates used;

Fig. 7 is a front view of the plate of Fig. 6; and

Fig. 8 is a section along the line 8—8 of Fig. 6.

Figure 1:
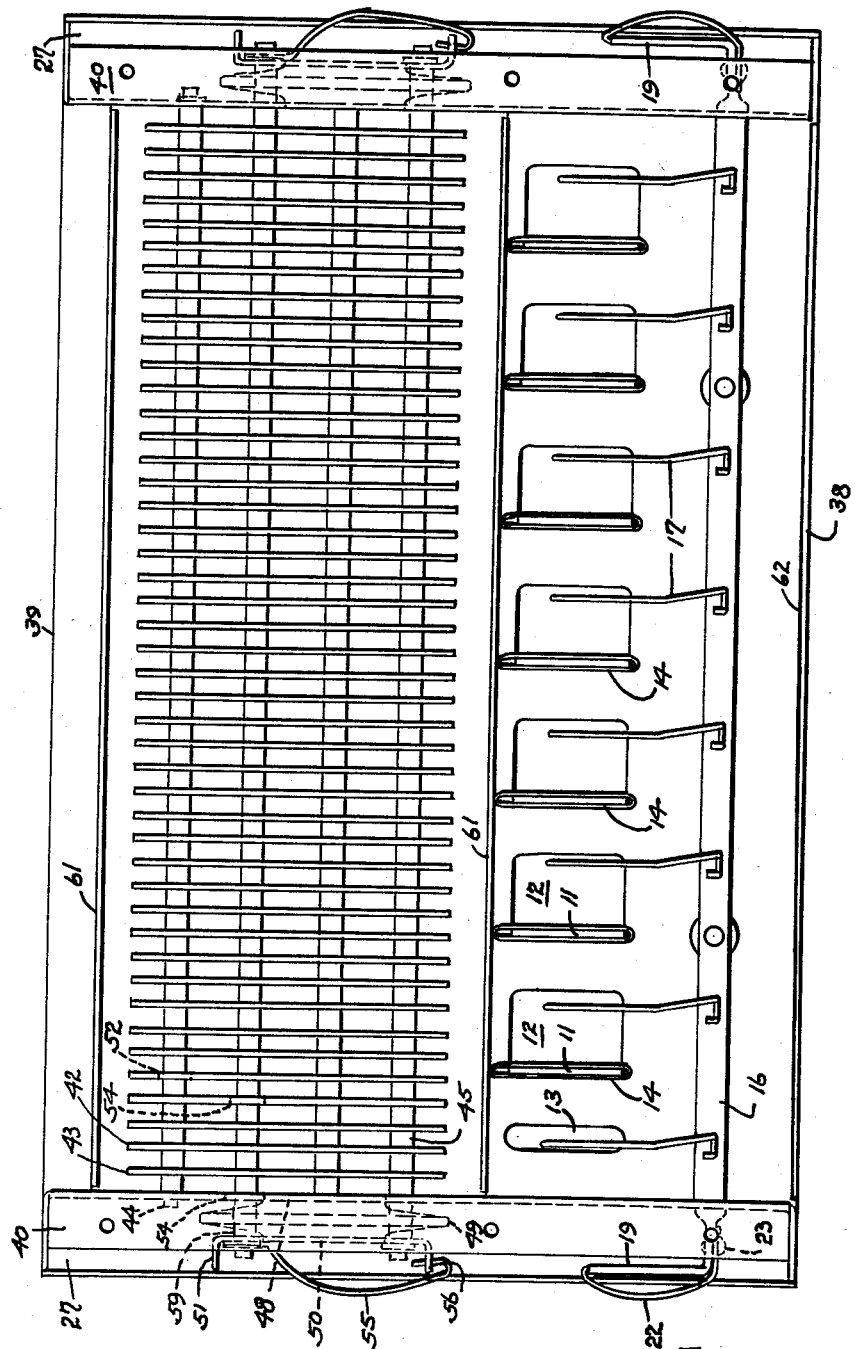
Fig. 1 is a plan view looking at the top of an electrostatic precipitator unit with the top plate removed, embodying this invention.
Figure 2:
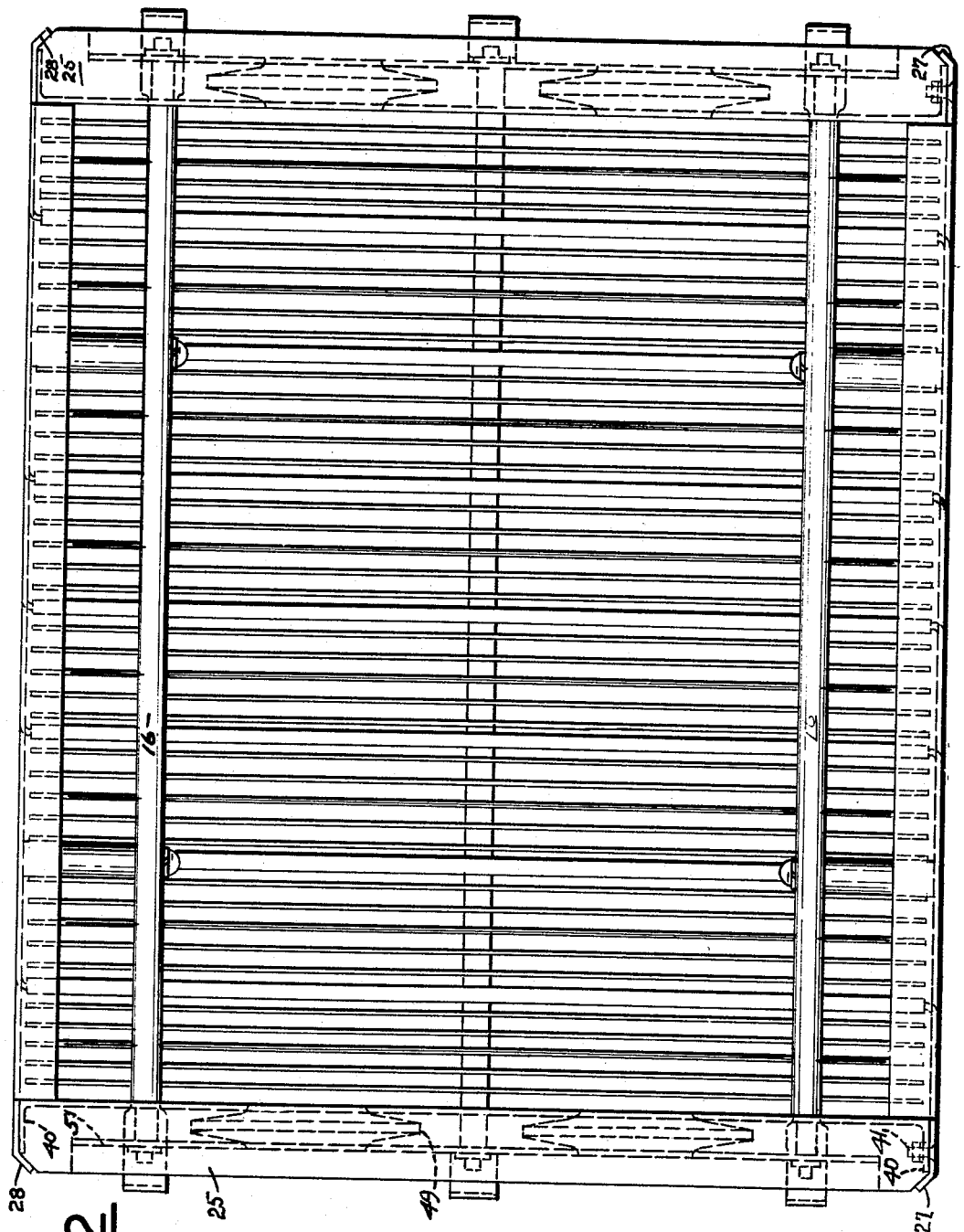
Fig. 2 is a front view of the unit of Fig. 1.
Figure 3:
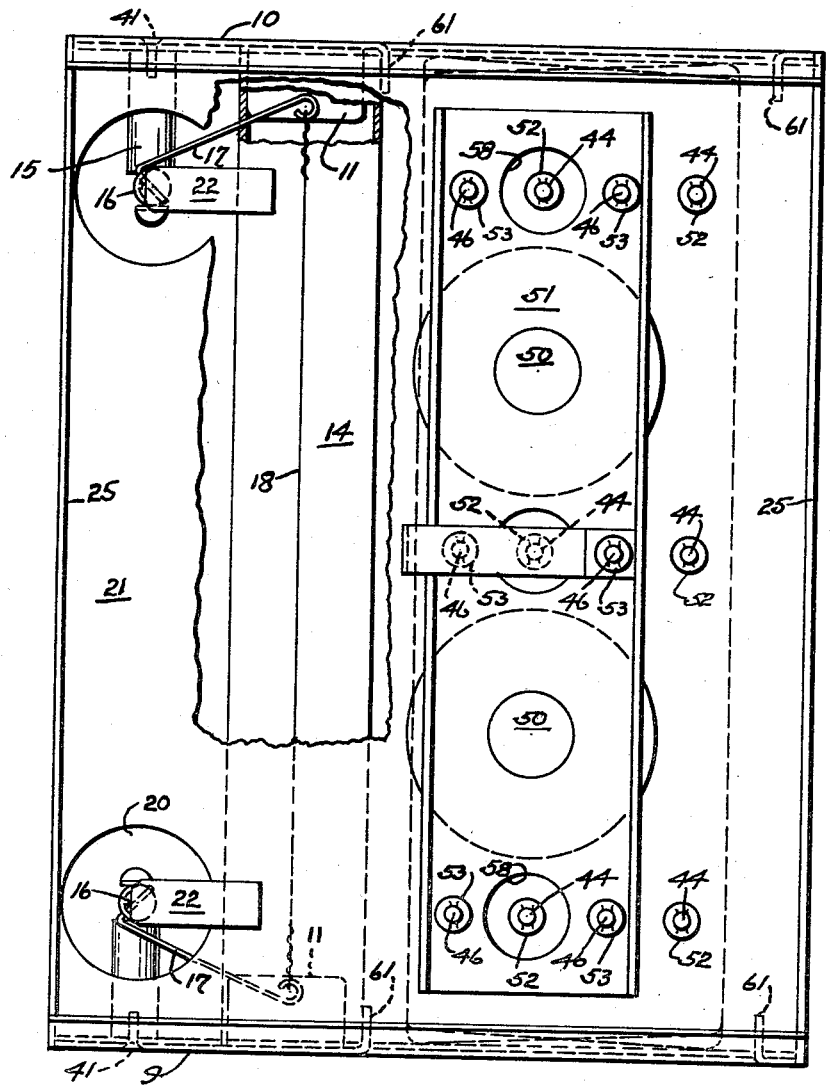
Fig. 3 is a side view of the unit with a portion of the adjacent side plate of the unit removed.

The unit has a top plate 10 and a bottom plate 9 which are similar. A top plate 10 is shown in Figs. 6, 7 and 8. Used as a bottom plate it would be inverted. Each plate 9 and 10 has near its front, straps 11 which are punched out of the plate leaving drainage holes 12 in the plate. An additional drainage hole 13 is provided alongside one of the outermost holes 12.

The straps 11 extend inwardly of the top and bottom plates perpendicular thereto, and into the interiors of flattened metal tubes 14 which form spaced-apart, parallel, non-discharging ionizer electrodes, the straps 11 supporting the tubes 14 at their ends.

Two pairs of tubular insulators 15 extend inwardly from the inner surfaces of the top and bottom plates 10 and 9 respectively, of the unit, near their front ends, and support metal tubes 16 which have slots in which are held U-shaped ends of ionizer wire supporting arms 17 of spring metal. The inner ends of the arms 17 support ionizer wires 18 which extend midway between adjacent tubes 14. The ends of the tubes 16 extend through clearance openings 20 in side plates 21 and outside the latter are flattened and turned inwardly perpendicular to the tubes to form flattened tube portions 19 into the interiors of which extend the ends of straps 22 of spring metal which are bowed outwardly along flattened tube portions 19 and have their outer ends secured thereto by screws 23.

The straps 22 contact high voltage terminals when the units are in operating position, for energizing the ionizer wires 18.

The side plates have outwardly turned flanges 25 along their sides which are beveled at their tops and bottoms at 26 to provide spaces for downwardly slanted end portions 28 of the top plate 10 and the upwardly slanted flanges 27 of the bottom plate 9. As shown by Figs. 4 and 5, these slanted flanges of four adjacent units in two vertical and two horizontal rows of units form a diamond-shaped space 29 through which a retaining rod 30 can be inserted. The rod 30 as shown by Fig. 5, has a back end portion with a recessed portion 31 fitted in a slot 32 in flange 33 of a frame 34, and has a wing-nut 35 threaded on its front end with an integral washer 36 in contact with the flanges 27 and 28.

The top and bottom plates and the side plates form an enclosure for the ionizer and for the collector plates, having a gas inlet 38 and a gas outlet 39 (Fig. 1). The side plates have outwardly extending flanges 40 at their tops and bottoms which are secured to the top plate 10 and bottom plate 9 by bolts 41 which extend through slots in the top and bottom flanges. The slots permit easy assembly in cases where manufacturing variations occur.

Charge collector plates 43 and ground collector plates 42 are alternately arranged.

The ground plates 42 are supported on tie rods 44 with spacers 45 therebetween, the tie rods and spacers extending through clearance openings 52 in the charge plates. The ends of the tie rods 44 extend through the side plates 21 in contact therewith, and are secured thereto by fasteners 52.

The charge plates 43 are supported on tie rods 46 with spacers 57 therebetween, the rods 46 and spacers 47 extending through clearance openings 54, in the ground plates and the side plates 21. Each side plate 21 has a pair of vertically aligned circular openings therein, into which are fitted inner circular ends 48 of disc-shaped insulators 49. The insulators 49 have outer circular ends 50 that are fitted in circular openings in brackets 51. The brackets are spaced from and insulated from the side plates by the insulators 49. The ends of the tie rods 46 of the charge plates extend through the brackets 51 in contact therewith, and are secured thereto by fasteners 53. One of the tie rods 46 located between the insulators 49 has secured to its ends corresponding ends of straps 55 of spring metal, which bow outwardly, and the other ends of which are bent over and extend through slots in out-turned flanges 56 of the brackets. The straps contact high voltage supply terminals when the unit is in operating position, for energizing the charge plates.

The brackets 51 have circular openings 58 opposite two of the tie rods 44 of the ground plates for providing access to the ends of such tie rods. Spacers 59 extend through clearance openings in the side plates between the outmost charge plates 43 and the brackets 51.

The collector plate assembly is seen to be somewhat similar to that disclosed in the U.S. Patent No. 2,535,696 of E. L. Richardson, but has the advantages thereover in that the same number of tie rods are used for the charge plates as for the ground plates so as to provide accurate spacing and minimum maintenance; in that adjacent tie rods are aligned in the direction of gas flow for minimum interference with gas flow. Another advantage is that plate spacing is taken care of in assembly, no separate adjustment after assembly being necessary.

The top and bottom plates 10 and 9 respectively, have rectangular-shaped openings 60 over and below respectively, the collector plates which permit, when the units are stacked vertically, adhesive and washing liquids projected from overhead, to flow downwardly through the collector plates of vertically aligned units.

The top and bottom plates at the front and back edges of the openings 60 have flanges 61, and have at their fronts flanges 62, which extend perpendicular to the top and bottom plates inwardly past the tops and bottoms of the collector plates, the flanges 61 forming baffles for preventing gas from by-passing the collector plates, and the flanges 62 preventing gas from by-passing the ionizer electrodes at their ends. The downstream flanges 61 also act as adhesive blow-off shields. The flanges 61 and 62 also act to add stiffness to the top and bottom plates.

The operation of my electrostatic precipitator would be conventional. The gas to be cleaned would be ionized as it passes between the ionizer wires 18 and the non-discharging ionizer electrodes 14, causing electrostatic charging of the small foreign particles entrained in the gas. The charged particles would then deposit upon the oppositely charged collector plates.

What is claimed is:

1. An electrostatic precipitator comprising top, bottom and side plates forming an open-ended rectangular casing having a gas inlet at one end and a gas outlet at the opposite end, a plurality of spaced-apart, parallel, vertically extending, collector plates supported from said side plates between said inlet and said outlet, said top and bottom plates having rectangular openings having front edges between said inlet and said collector plates, having side edges between the outermost of said collector plates and said side plates, and having back edges between said collector plates and said outlet, said openings extending above and below said collector plates for permitting liquid to be supplied through the opening in the top plate onto the collector plates, and for permitting the liquid draining from the collector plates to pass out the opening in the bottom plate.

2. An electrostatic precipitator as claimed in claim 1 in which said top and bottom plates have inwardly extending flanges at said front and back edges, forming baffles for preventing gas from by-passing said collector plates.

3. An electrostatic precipitator comprising a pair of parallel metal side plates, a plurality of spaced-apart parallel, charge and ground, metal collector plates, said charge and ground collector plates being alternately arranged, a plurality of metal tie rods supporting said ground plates from said side plates and having their ends extending through and attached to said side plates, metal spacers between adjacent ground plates and between end ground plates and said side plates, said tie rods and spacers extending through clearance openings in said charge plates, a pair of disc-shaped insulators having circular inner surfaces of reduced diameter within circular holes in said side plates, and having outer circular surfaces of reduced diameter, metal brackets extending parallel to said side plates and having circular holes around said outer surfaces of said insulators, a second plurality of metal tie rods supporting said charge plates from said brackets and having their ends extending through and attached to said brackets, metal spacers between adjacent charge plates, said tie rods of said second plurality and said last mentioned spacers extending through clearance openings in said ground plates, and metal spacers between the outermost of said charge plates and said brackets and extending through clearance openings in said side plates.

4. An electrostatic precipitator comprising top, bottom and side plates forming an open ended, rectangular enclosure having a gas inlet at one end and a gas outlet at the opposite end, a plurality of flattened tubes forming non-discharging electrodes extending between said top and bottom plates adjacent said inlet, the interiors of said tubes being formed as slots extending parallel to said side plates, said top and bottom plates having straps punched therefrom and extending into said slots for supporting said tubes and having holes between said tubes, said holes in said top plate permitting adhesive and cleaning liquids to flow therethrough onto said tubes, and said holes in said bottom plate permitting adhesive and cleaning liquids to drain from said precipitator enclosure, ionizer wires, and means for insulatedly supporting said wires from said top and bottom plates midway between said tubes.

References Cited in the file of this patent

UNITED STATES PATENTS

| | | |
|---|---|---|
| 2,255,677 | Penney | Sept. 9, 1941 |
| 2,380,992 | Pegg et al. | Aug. 7, 1945 |

FOREIGN PATENTS

| | | |
|---|---|---|
| 745,609 | Great Britain | Feb. 29, 1956 |